United States Patent
Voltz et al.

(10) Patent No.: US 8,019,036 B2
(45) Date of Patent: Sep. 13, 2011

(54) METHOD AND APPARATUS FOR CORRECTING SAMPLER CLOCK FREQUENCY OFFSET IN OFDM MIMO SYSTEMS

(75) Inventors: Peter J. Voltz, Commack, NY (US); Robert Lind Olesen, Huntington, NY (US); I-Tai Lu, Dix Hills, NY (US); Chang-Soo Koo, Melville, NY (US); Qingyuan Dai, Germantown, MD (US); Yongwen E. Yang, Hillsborough, NJ (US); Hui-Yuan Teng, Forest Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 804 days.

(21) Appl. No.: 11/681,341

(22) Filed: Mar. 2, 2007

(65) Prior Publication Data

US 2007/0223605 A1 Sep. 27, 2007

Related U.S. Application Data

(60) Provisional application No. 60/779,769, filed on Mar. 7, 2006.

(51) Int. Cl.
*H03D 3/24* (2006.01)
(52) U.S. Cl. .......... 375/373; 375/371; 375/354; 714/12; 709/248; 327/141
(58) Field of Classification Search .................. 375/260
See application file for complete search history.

(56) References Cited

U.S. PATENT DOCUMENTS

| | | | | |
|---|---|---|---|---|
| 5,732,113 | A * | 3/1998 | Schmidl et al. | 375/355 |
| 5,745,075 | A * | 4/1998 | Enge et al. | 342/367 |
| 7,009,931 | B2 * | 3/2006 | Ma et al. | 370/208 |
| 7,088,782 | B2 * | 8/2006 | Mody et al. | 375/260 |
| 7,274,735 | B2 * | 9/2007 | Lusky et al. | 375/227 |
| 7,308,063 | B2 * | 12/2007 | Priotti | 375/362 |
| 7,346,114 | B2 * | 3/2008 | Iancu et al. | 375/260 |
| 7,388,921 | B2 * | 6/2008 | Peter et al. | 375/260 |
| 7,505,523 | B1 * | 3/2009 | Lee et al. | 375/260 |
| 7,590,193 | B2 * | 9/2009 | Han | 375/326 |
| 7,596,181 | B2 * | 9/2009 | Chang et al. | 375/260 |
| 2002/0065047 | A1 * | 5/2002 | Moose | 455/63 |
| 2002/0122382 | A1 * | 9/2002 | Ma et al. | 370/208 |
| 2003/0112896 | A1 * | 6/2003 | Raghavan et al. | 375/322 |
| 2004/0120410 | A1 | 6/2004 | Priotti | |
| 2004/0264584 | A1 * | 12/2004 | Labs et al. | 375/260 |
| 2006/0039491 | A1 * | 2/2006 | Han | 375/260 |

(Continued)

OTHER PUBLICATIONS

Al et al., *Carrier Frequency Recovery Technique in OFDM Systems*, Wireless Personal Communications, vol. 32, No. 2, pp. 177-188, (Jan. 2005).

(Continued)

*Primary Examiner* — Chieh M Fan
*Assistant Examiner* — Santiago Garcia
(74) *Attorney, Agent, or Firm* — Volpe and Koenig, P.C.

(57) ABSTRACT

In an orthogonal frequency division multiplexed (OFDM) multiple-in multiple-out (MIMO) wireless communication system, a method for correcting sampler clock frequency offset in a receiver comprises acquiring the frequency offset and symbol timing in a received signal by the receiver. The estimated value of a fractional offset is computed, and a correction in the frequency domain based upon the estimated value of the fractional offset is performed.

31 Claims, 5 Drawing Sheets

U.S. PATENT DOCUMENTS

| | | | |
|---|---|---|---|
| 2006/0239370 A1* | 10/2006 | Mody et al. | 375/260 |
| 2006/0285578 A1* | 12/2006 | Weisenhorn et al. | 375/130 |
| 2007/0002878 A1* | 1/2007 | Moorti et al. | 370/401 |
| 2007/0053462 A1* | 3/2007 | Pirooz et al. | 375/285 |
| 2007/0088515 A1* | 4/2007 | Kim | 702/79 |
| 2007/0183518 A1* | 8/2007 | Ma et al. | 375/260 |
| 2008/0080631 A1* | 4/2008 | Forenza et al. | 375/260 |
| 2008/0247480 A1* | 10/2008 | Ionescu et al. | 375/260 |

OTHER PUBLICATIONS

Al et al., *Decimal Frequency Offset Estimation in COFDM Wireless Communications*, IEEE Transactions on Broadcasting, vol. 50, No. 2, pp. 154-158, (Jun. 2004).

\* cited by examiner

US 8,019,036 B2

METHOD AND APPARATUS FOR CORRECTING SAMPLER CLOCK FREQUENCY OFFSET IN OFDM MIMO SYSTEMS

CROSS REFERENCE TO RELATED APPLICATION

This application claims the benefit of U.S. Provisional Application No. 60/779,769, filed Mar. 7, 2006 which is incorporated by reference herein as if fully set forth.

FIELD OF INVENTION

The present invention is related to offset correction in orthogonal frequency division multiplexed (OFDM) systems. More particularly, the present invention is related to a method an apparatus for correcting sampler clock frequency offset in OFDM multiple-out multiple-in (MIMO) systems.

BACKGROUND

The oscillators that are used in a digital to analog converter (DAC) and an analog to digital converter (ADC) at the sampling instants for the transmitter and the receiver do not ordinarily have the exact same period. Accordingly, the sampling instants tend to shift relative to one another, causing a sampling clock error.

This sampling clock error has a number of negative effects. It causes a slow shift of the timing symbol point, which in turn, rotates the subcarriers. Also, there may be a loss of signal to noise ratio (SNR) due to intercarrier interference (ICI) generated by the slightly incorrect sampling instants, which causes loss of the orthogonality of the subcarriers.

One possible way to correct the rotation of the subcarriers caused by the sampling frequency offset is by adjusting the sample frequency of the DAC of the receiver. However, adjusting the sampling clock requires an adjustment to a complicated analog part of the receiver, and analog components are relatively costly in comparison to digital solutions.

Accordingly, it would be advantageous to provide an efficient and more cost effective method and apparatus to correct the effects of sampler clock frequency offset in orthogonal frequency division multiplexed (OFDM) systems.

SUMMARY

The present invention is related to a method and apparatus for correcting the effect of sampler clock frequency offset in orthogonal frequency division multiplexed (OFDM) multiple-in multiple-out (MIMO) systems. The rotation of subcarriers is corrected by de-rotating the subcarriers after fast fourier transform (FFT) processing. An additional "rob" or "stuff" block after analog to digital conversion (ADC) is utilized since the clock drift in sampling instant will eventually be larger than the sampling period. The rob block removes one sample from the signal, while the stuff block creates a duplicate sample in the signal.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention is directed toward a method and apparatus for correcting the effect of sampler clock frequency offset in orthogonal frequency division multiplexed (OFDM) systems, and in particular multiple-in multiple-out (MIMO) OFDM systems. The rotation of subcarriers is corrected by de-rotating the subcarriers after fast fourier transform (FFT) processing. An additional "rob" or "stuff" block after analog to digital conversion (ADC) is utilized since the clock drift in sampling instant will eventually be larger than the sampling period. The rob block removes one sample from the signal, while the stuff block creates a duplicate sample in the signal.

Figure 1A:
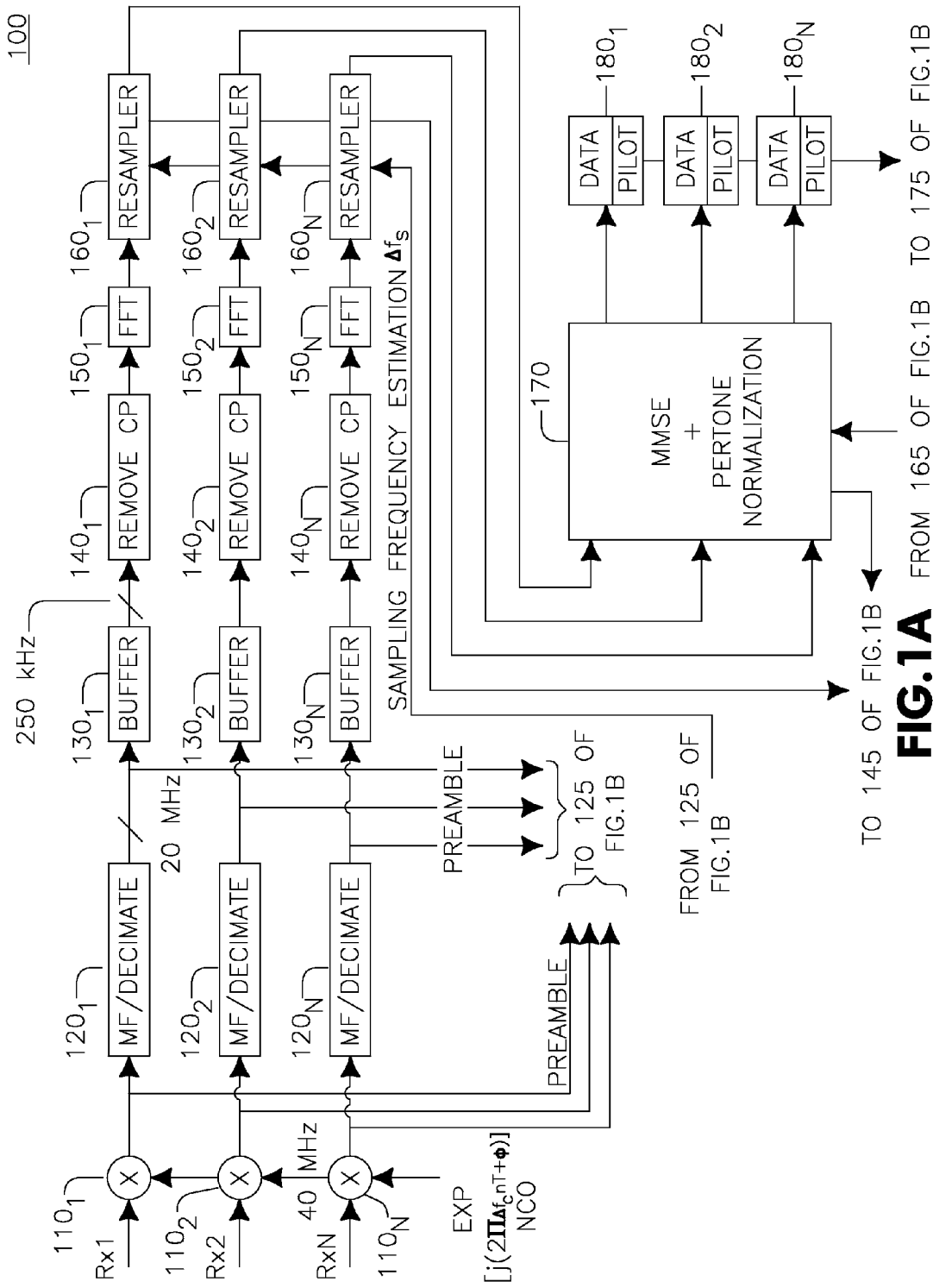
FIGS. 1A and 1B show a functional block diagram of an orthogonal frequency division multiplexing (OFDM) multiple-in multiple-out (MIMO) receiver, in accordance with the present invention.
Figure 1B:
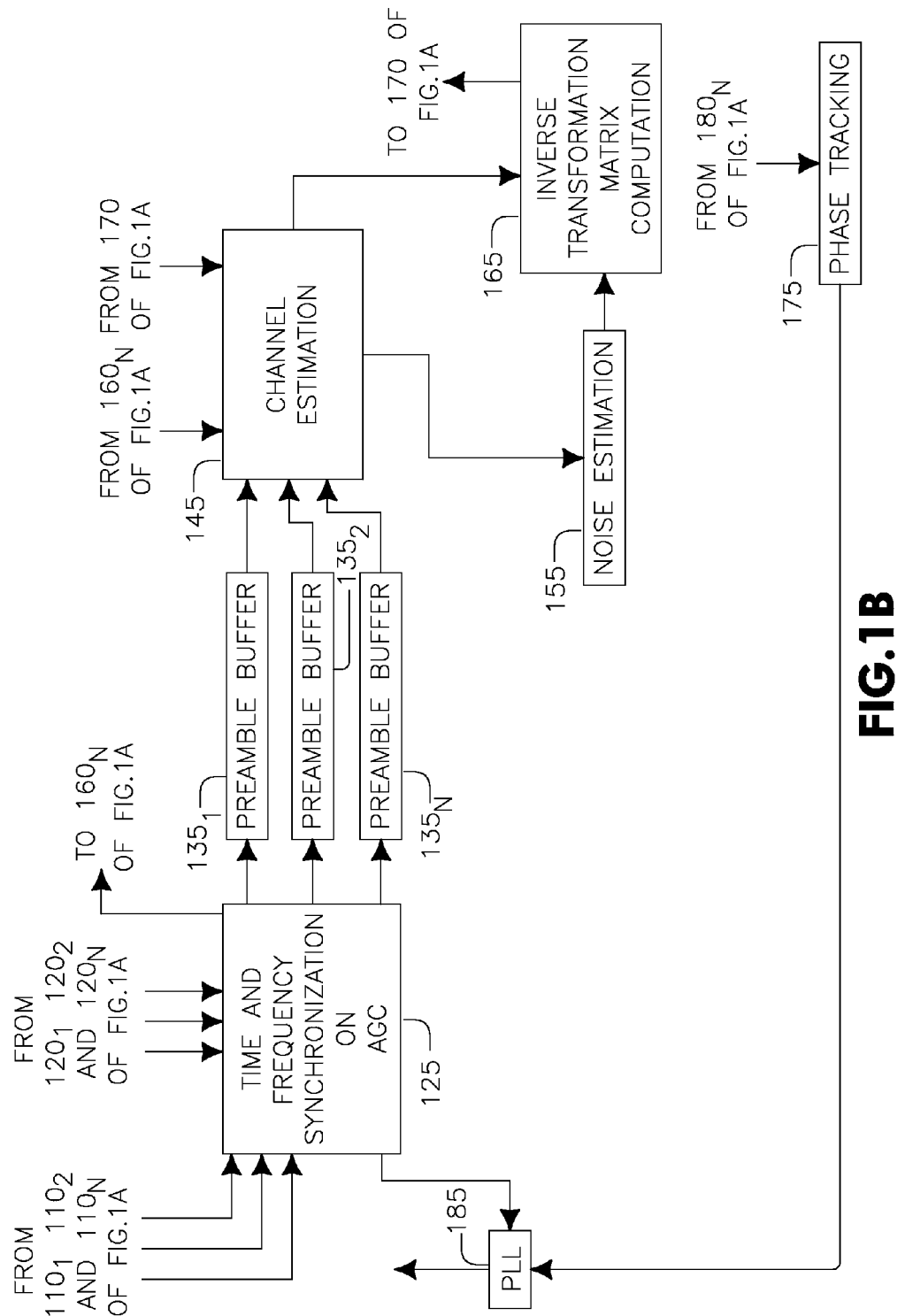

FIGS. 1A and 1B show a functional block diagram of an OFDM MIMO receiver 100, in accordance with the present invention. The OFDM MIMO receiver 100 is configured to receive a plurality of received signals Rx (designated Rx1, Rx2, . . . , RxN) in a plurality of mixers 110 (designated 110₁, 110₂, . . . , 110N), where the signals are mixed with a numerically controlled oscillator (NCO) signal ($\exp j(2\pi f_c nT+\phi)$) and down-converted to the baseband signal. The received signals Rx are received at an antenna input in a preferred embodiment. Each mixed signal is then transferred from its respective mixer 110 to a matched filter (MF)/Decimate block 120 (designated $120_1$, $120_2$, . . . , $120_N$), which is running at the over sampling rate (OSR). The decimation to symbol rate (Tsym) in a preferred embodiment is fifty nanoseconds (50 ns). From the MF/decimate blocks 120, the signal is transferred to a respective buffer 130 (designated $130_1$, $130_2$, . . . $130_N$), and on to a Remove Cyclic Prefix (CP) block 150 (designated $140_1$, $140_2$, . . . , $140_N$), which removes the CP from the signal (i.e. the guard interval). The sample rate shown in FIG. 1 is 20 MHz and the OSR is two. Accordingly, the NCO clocking rate is 40 MHz, which is the sample rate multiplied by the OSR. The OFDM symbol rate is 250 kHz.

A fast fourier transform (FFT) is performed on each received signal in a respective FFT block 150 (designated $150_1$, $150_2$, . . . , $150_N$), where the time domain received signal is converted to a frequency domain signal. After the FFT, the signal is processed in a respective Re-Sampler block 160 (designated $160_1$, $160_2$, . . . , $160_N$). In a preferred embodiment of the present invention, the Re-Sampler block 160 performs correction to correct the effect of clocking errors by removing the clocking impairment. Once the re-sampler block has the amplitude and phase impact calculated from the clock impairment, the correction may be performed by multipliers.

Once processed in the re-sampler blocks 160, the processed signals, with clocking impairments removed, are sent to a minimum mean square estimation (MMSE) and Pertone Normalization block 170, which recovers transmitted data in the received signal from noise, and on to respective data/pilot blocks 180 (designated $180_1, 180_2, \ldots, 180_N$), which separate data and pilot bits. The pilot bits are provided to a phase tracking block 175. In an embodiment of the present invention, the data/pilot blocks 180 perform soft demodulating, de-interleaving, de-muxing, soft viterbi decoding, and the like.

A preamble from each mixer 110 is extracted and forwarded to a Time and Frequency Synchronization on Automatic Gain Control (AGC) block 125. Similarly, a preamble from each MF/decimate block 120 is forwarded to the Time and Frequency Synchronization on AGC block 125. The Time and Frequency Synchronization on AGC block 125 estimates the fractional clocking error, and forwards a sampling frequency estimation ($\Delta f_s$) to the Re-sampler blocks 160, and forwards the preambles on to respective preamble buffers 135 (designated $135_1, 135_2, \ldots, 135_N$) and a phase locked loop (PLL) block 185. The PLL block 185 also receives a signal from the phase tracking block 175. The PLL block 185 tracks the phase difference, adjusts the sampling clock and carrier frequency offset, and outputs the NCO signal, adjusting the NCO clock.

A channel estimation block 145 receives the preambles from the preamble buffers 135, and information from the Re-Samplers 160, and performs a channel estimation. The channel estimation block 145 forwards the signal along to a noise estimation block 155, which estimates the noise in the received signals. An inverse transformation matrix computation block 165 computes the inverse transformation matrix from the channel and noise estimations from the channel estimation block 145 and noise estimation block 155. The inverse transformation matrix computation block provides an output to the MMSE and Pertone Normalization block 170.

Figure 2:
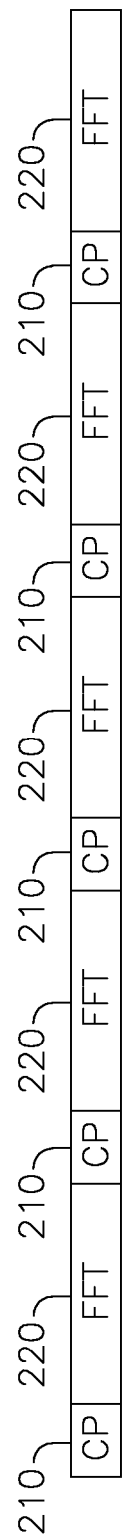
FIG. 2 shows an exemplary sequence of symbols in an OFDM signal received by the receiver of FIG. 1.

FIG. 2 shows an exemplary sequence 200 of symbols in an OFDM signal received by the receiver 100 of FIG. 1. The sequence 200 includes a plurality of CP intervals 210, and FFT intervals 220. The CP interval 210 allows transient response due to the communications channel to die out before the receiver 100 computes the FFT required to demodulate the OFDM symbol. The FFT interval 220 is the interval during which an FFT is typically computed from the samples of the received signals (Rx1 . . . RxN). The time duration of the CP intervals 210 is defined as $T_G$, and the time duration of the FFT interval 220 is defined as T.

In order to express an OFDM signal mathematically, a time origin for each symbol should be referred to. For the following examples, a time origin of zero is assumed (t=0). Additionally, for purposes of example, it may be assumed that the time origin for any symbol is the time at which the first sample to be used in the FFT should ideally be taken if the receiver sampler is perfectly synchronized.

For a given OFDM symbol, a received baseband complex signal includes a transient part contained within the CP interval 210. Ordinarily, the transient begins at the beginning of the CP interval 210 and dies out at some point in time prior to the end of the CP interval 210. Once the transient dies out, the received signal may be expressed in accordance with the following equation:

$$y(t) = \left(\frac{1}{N}\sum_{k=0}^{N-1} Y_k e^{j\frac{2\pi}{T}kt}\right) e^{j(2\pi f_\delta t + \theta(t))};$$ Equation (1)

where $Y_k$ designates the subcarrier amplitudes, $f_\delta$ is a carrier frequency offset between the received signal (Rx) and the receiver local oscillator, and $\theta(t)$ is the phase offset between the received signal and the receiver local oscillator.

Again, for purposes of example, it may be assumed the carrier frequency and phase have been acquired prior to the point at which an algorith for correcting sampler frequency begins. Accordingly, under this assumption, Equation (1) becomes:

$$y(t) = \frac{1}{N}\sum_{k=0}^{N-1} Y_k e^{j\frac{2\pi}{T}kt}.$$ Equation (2)

Ideally, the first sample for calculating the FFT is taken at t=0, and the remaining N−1 samples are separated in time by the sampling interval $T_s$=T/N, where N is the order of the FFT. If, therefore, the receiver sampler clock were in perfect frequency synchronization with the incoming signal timing, and the first sample is taken at t=0, the receiver samples would occur at the times $$nT_s = n\frac{T}{N}$$

and the received samples would be:

$$y(nT_s) = \frac{1}{N}\sum_{k=0}^{N-1} Y_k e^{j\frac{2\pi}{T}kn\frac{T}{N}} = \frac{1}{N}\sum_{k=0}^{N-1} Y_k e^{j\frac{2\pi}{N}kn}.$$ Equation 3

Equation (3) is proportional to the inverse FFT (IFFT) of the subcarrier amplitude set $Y_k$. Therefore, when the FFT of these samples are taken, the outputs will be proportional to $Y_k$, resulting in correct operation of the OFDM demodulator.

Sampler clock frequency offset in the receiver may be modeled by altering the sampling interval, so that $T_s$ becomes:

$$T_s = \frac{T}{N}(1 + \alpha);$$ Equation (4)

where the parameter $\alpha$ represents the fractional offset in sampling interval. If the sampling interval is off by fifty (50) parts per million (ppm) for example, then $\alpha=50\times10^{-6}$. It should be noted that 50 ppm is typical for IEEE 802.11a/b/g/n systems.

If the receiver samples with interval $T_s$ as in Equation (4), and it is assumed that the first sample taken for the symbol is at $t=t_d$ due to timing drift, rather than at t=0, then the receiver samples are taken at the times $$nT_s + t_d = n\frac{T}{N}(1+\alpha) + t_d,$$

and the samples become:

$$y(nT_s + t_d) = \frac{1}{N}\sum_{k=0}^{N-1} Y_k e^{j\frac{2\pi}{T}kn\frac{T}{N}(1+\alpha)} e^{j\frac{2\pi}{T}kt_d};$$ Equation (5)

which may also be written as:

$$y(nT_s + t_d) = \frac{1}{N}\sum_{k=0}^{N-1} Y_k e^{j\frac{2\pi}{N}kn(1+\alpha)} e^{j\frac{2\pi}{T}kt_d}.$$ Equation (6)

Taking the FFT of these samples using the standard FFT formula yields:

$$Z_l = \sum_{n=0}^{N-1} y(nT_s) e^{-j\frac{2\pi}{N}ln};$$ Equation (7)

which becomes, using Equation (6):

$$Z_l = \sum_{n=0}^{N-1} \left( \frac{1}{N}\sum_{k=0}^{N-1} Y_k e^{j\frac{2\pi}{T}kt_d} e^{j\frac{2\pi}{N}kn(1+\alpha)} \right) e^{-j\frac{2\pi}{N}ln},$$

$$Z_l = \sum_{k=0}^{N-1} Y_k e^{j\frac{2\pi}{T}kt_d} \left( \frac{1}{N}\sum_{n=0}^{N-1} e^{j\frac{2\pi}{N}n(k(1+\alpha)-l)} \right),$$

$$Z_l = \sum_{k=0}^{N-1} Y_k e^{j\frac{2\pi}{T}kt_d} \left( \frac{1}{N}\frac{1 - e^{j2\pi(k+1+\alpha)-l}}{1 - e^{j\frac{2\pi}{N}(k(1+\alpha)-l)}} \right).$$ Equation (8)

If the value $\alpha$ is very small, then the quantity in the brackets is negligibly different from the kronecker delta, $\delta(l-k)$, producing:

$$Z_l \approx Y_l e^{j\frac{2\pi}{T}lt_d}.$$ Equation (9)

If the value of $\alpha$ is known, then $t_d$ for each symbol in the packet may be calculated, and the extra phase roll due to this in equation (9) corrected, by multiplying by $$e^{-j\frac{2\pi}{T}lt_d}.$$

For example, the sampler clock may be tied to the carrier frequency oscillator, in which case the relative offsets for the sampling and the carrier phase will be equal.

Figure 3A:
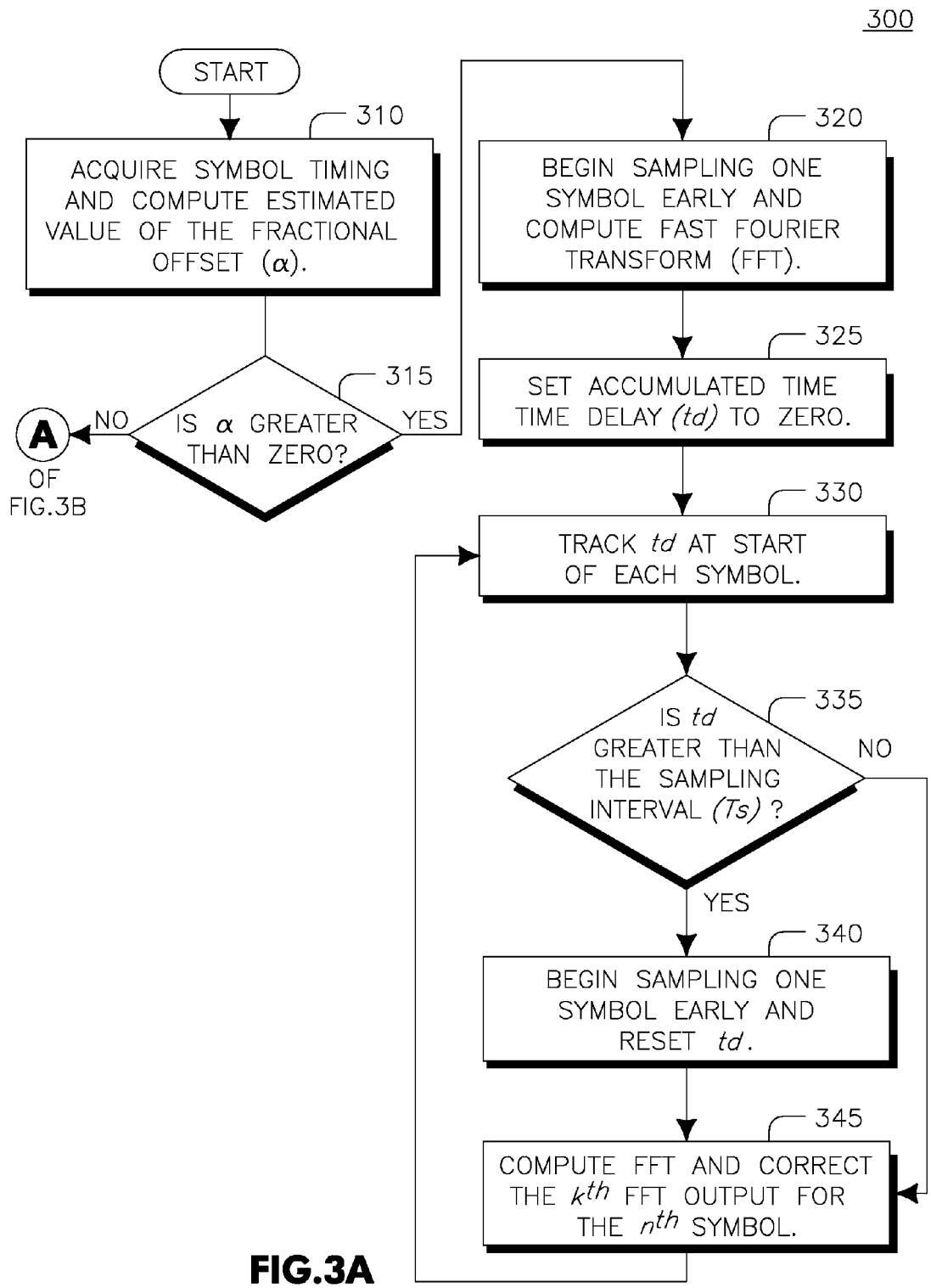
FIGS. 3A and 3B show a flow diagram of a method for correcting the effect of sampler clock frequency offset in OFDM systems, in accordance with the present invention.
Figure 3B:
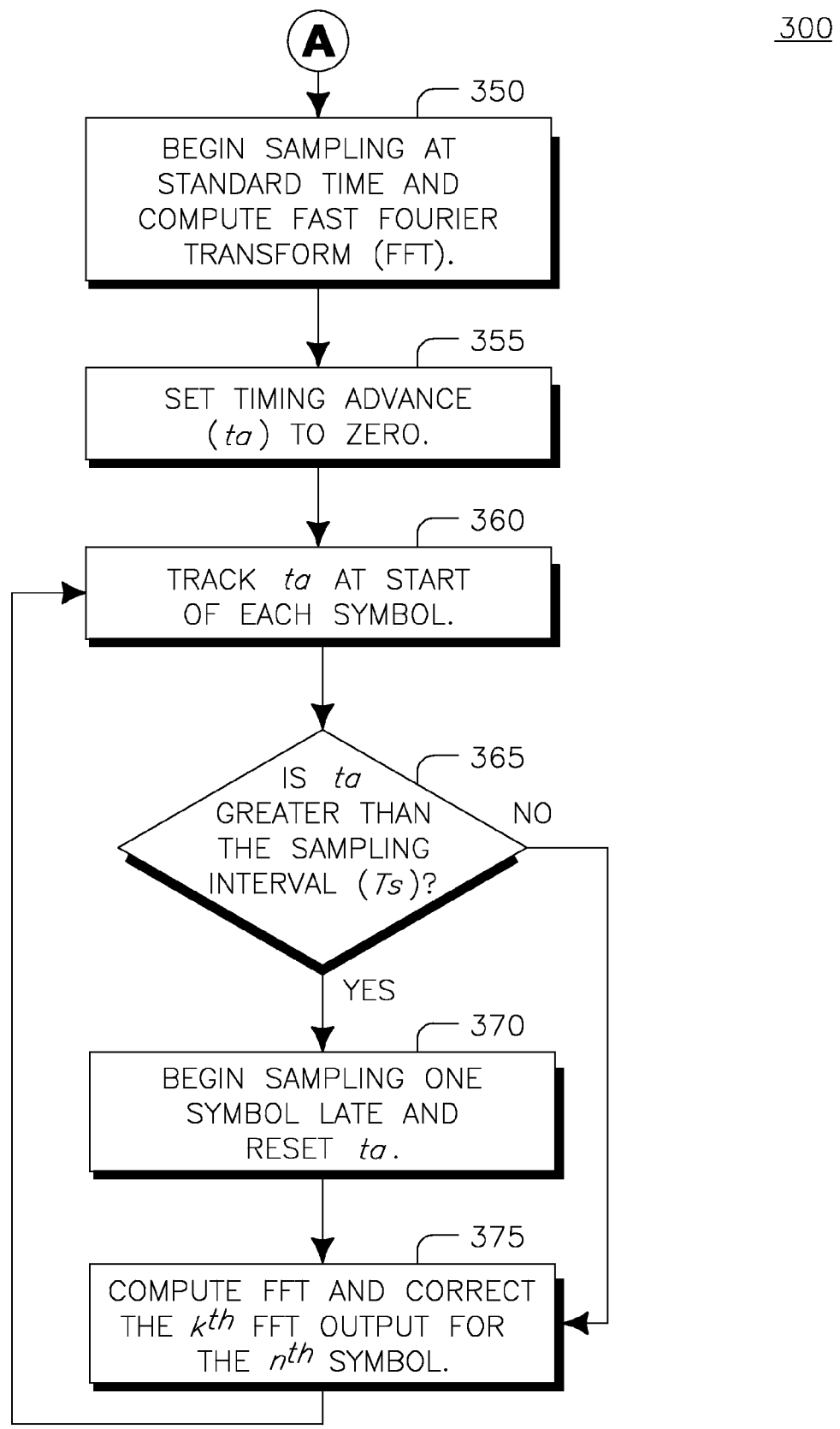

FIGS. 3A and 3B show a flow diagram of a method 300 for correcting the effect of sampler clock frequency offset in OFDM systems, in accordance with the present invention. In step 310, the symbol timing and the frequency offset are acquired, and the estimated value of the fraction offset, $\alpha$, is computed. In general, the receiver sampler timing is typically acceptable as the symbol timing, and the accumulated timing advance or retardation is tracked as successive symbols are sampled. If necessary, corrections in the frequency domain are made.

If $\alpha$ is greater than zero (step 315), meaning the receiver clock is running slow, then sampling is begun one sample early for the first symbol after the symbol timing has been acquired (that is, at OSR=1), and the FFT outputs for this symbol are taken as is (step 320). The accumulated time delay, $t_d$, is set to zero (step 325) and is tracked for the second and successive symbols at the start of each symbol (step 330). In one exemplary embodiment, the following equation for tracking is used:

$$t_d(n) = t_d(n-1) + \alpha T_{symb}$$ Equation (10)

In step 335, if the accumulated time delay is less than or equal to the sampling interval ($t_d(n) \leq T_s$), then the method proceeds to step 345. However, in step 335, if on any symbol the accumulated time delay is greater than the sampling interval ($t_d(n)$ exceeds $T_s$), then sampling of that symbol is begun one sample earlier (step 340). That is, one less sample than usual is skipped for the guard interval and $t_d$ is reset, preferably as follows: $t_d(n) \rightarrow t_d(n) - T_s$. This effectively introduces a "stuff" block into the signal.

In step 345, the FFT is computed for the symbol and the $k^{th}$ FFT output for the nth symbol is corrected as follows:

$$Y_k \rightarrow Y_k e^{-j\frac{2\pi}{T}kt_d(n)}.$$ Equation (11)

The method then returns to step 330 for the next symbol.

Referring back to step 315, if $\alpha$ is less than or equal to zero, meaning the receiver clock is running fast, then sampling is begun at the standard time for the first symbol after the symbol timing has been decided and the FFT outputs are taken for the symbol as is (step 350) (FIG. 3B). The timing advance ($t_a$) is set to zero (step 355) and the accumulated time advance is tracked at the start of each symbol for the second and successive symbols (step 360). In an exemplary embodiment, the following equation for tracking the time advance is used:

$$t_a(n) = t_a(n-1) + |\alpha| T_{symb}$$ Equation (12)

In step 365, if the accumulated time advance is less than or equal to the sampling interval ($t_a(n) \leq T_s$), then the method proceeds to step 375. For purposes of example, the sampling interval ($T_s$) equals fifty nanoseconds (50 ns). However, in step 365, if on any symbol the accumulated time advance is greater than the sampling interval ($t_a(n)$ exceeds $T_s$), then sampling for that symbol is begun one sample later (step 370). That is, one sample more than usual is skipped for the guard interval, and $t_a(n)$ is reset preferably as follows: $t_a(n) \rightarrow t_a(n) - T_s$. This essentially performs a "rob" on a block in the signal.

In step 375, the FFT is computed for the symbol and the $k^{th}$ FFT output for the $n^{th}$ symbol is corrected as follows:

$$Y_k \rightarrow Y_k e^{j\frac{2\pi}{T}kt_a(n)}.$$ Equation (13)

The method then returns to step 360 for the next symbol.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. In orthogonal frequency division multiplexed (OFDM) multiple-in multiple-out (MIMO) wireless communications, a method for correcting sampler clock frequency offset in a receiver, the method comprising: receiving a plurality of signals;
   mixing the plurality of signals with a numerically controlled oscillator (NCO) signal and down-converting the mixed signals to a baseband signal filtering the mixed signals to create filtered signals buffering the filtered signals to create buffered signals removing cyclic prefix (CP) from the buffered signals;
   performing a fast fourier transform (FFT) on each of the CP removed received signals wherein each of the CP removed received signals is converted to a frequency domain signal;
   removing by a re-sampler a clocking impairment from each of the frequency domain plurality of received signals and using the clocking impairment to determine a phase offset and to create processed signals;
using the phase offset to determine a frequency offset and symbol timing and to adjust the numerically controlled oscillator (NCO) signal;
   computing an estimated value of a fractional offset using the frequency offset and the symbol timing; and
   performing a correction in the frequency domain for each of the processed signals based upon the estimated value of the fractional offset.

2. The method of claim 1 wherein the fractional offset is greater than zero.

3. The method of claim 2, further comprising:
   sampling one sample earlier for a first symbol in the processed signal after acquiring symbol timing; and
   computing a fast fourier transform (FFT) for the first symbol.

4. The method of claim 3, further comprising:
   setting an accumulated time delay to zero; and
   tracking the accumulated time delay at the start of each successive symbol after the first symbol.

5. The method of claim 4 wherein the accumulated time delay on a particular successive symbol is greater than the sampling interval.

6. The method of claim 5, further comprising:
   sampling the particular successive symbol one sample early; and
   resetting the accumulated time delay.

7. The method of claim 6 wherein resetting the accumulated time delay further comprises subtracting the sampling interval from the current accumulated time delay.

8. The method of claim 6, further comprising:
   computing an FFT for the particular successive symbol; and
   correcting the FFT output for the particular successive symbol.

9. The method of claim 4 wherein the accumulated time delay on a particular successive symbol is less than or equal to the sampling interval.

10. The method of claim 9, further comprising:
    computing an FFT for the particular successive symbol; and
    correcting the FFT output for the particular successive symbol.

11. The method of claim 1 wherein the fractional offset is less than or equal to zero.

12. The method of claim 11, further comprising:
    sampling at a standard time for a first symbol in the processed signal after acquiring symbol timing; and
    computing a fast fourier transform (FFT) for the first symbol.

13. The method of claim 12, further comprising:
    setting an accumulated time advance to zero; and
    tracking the accumulated time advance at the start of each successive symbol after the first symbol.

14. The method of claim 13 wherein the accumulated time advance on a particular successive symbol is greater than the sampling interval.

15. The method of claim 14, further comprising:
    sampling the particular successive symbol one sample late; and
    resetting the accumulated time advance.

16. The method of claim 15 wherein resetting the accumulated time delay further comprises subtracting the sampling interval from the current accumulated time advance.

17. The method of claim 15, further comprising:
    computing an FFT for the particular successive symbol; and
    correcting the FFT output for the particular successive symbol.

18. The method of claim 13 wherein the accumulated time advance on a particular successive symbol is less than or equal to the sampling interval.

19. The method of claim 18, further comprising:
  computing an FFT for the particular successive symbol; and
  correcting the FFT output for the particular successive symbol.

20. A wireless transmit/receive unit (WTRU) comprising:
a receiver configured to receive a plurality of signals, wherein the plurality of signals are mixed with a numerically controlled oscillator (NCO) signal and the mixed signals are down-converted to a baseband signal;
  a matched filter block, configured to filter the mixed signals to create filtered signals;
  a buffer block, configured to buffer the filtered signals to create buffered signals;
  a remove cyclic prefix (CP) block, configured to remove CP from the buffered signals;
  a fast fourier transform (FFT) block, configured to produce a frequency domain signal for each of the CP removed signals; a phase tracking block, configured to produce a phase offset;
a phase locked loop (PLL) block, configured to use the phase offset to determine a frequency offset and symbol timing and to adjust the numerically controlled oscillator (NCO) signal;
  a resampler block, configured to receive the frequency offset and the symbol timing, compute an estimated value of a fractional offset, perform a correction in the frequency domain based upon the estimated value of the fractional offset and create processed signals; and a time and frequency synchronization block, configured to produce sampling frequency estimation on the processed signal.

21. The WTRU of claim 20 wherein the input is an antenna input.

22. The WTRU of claim 21 wherein the antenna input includes a plurality of antenna inputs configured to receive a plurality of signals.

23. The WTRU of claim 20, further comprising:
  a matched filter (MF)/Decimate block; and
  a minimum mean square error (MMSE) and pertone normalization block, configured to recover transmitted data in the processed signal from noise.

24. The WTRU of claim 23, further comprising a data/pilot block, configured to separate data bits from pilot bits in the processed signal.

25. The WTRU of claim 24 wherein the data/pilot block processes the processed signal via soft demodulating, de-interleaving, de-muxing, or soft viterbi decoding.

26. An integrated circuit (IC) comprising:
  a receiver configured to receive a plurality of signals wherein the plurality of signals are mixed with a numerically controlled oscillator (NCO) signal and the mixed signals are down-converted to a baseband signal;
  a matched filter block, configured to filter the mixed signals to create filtered signals;
  a buffer block configured to buffer the filtered signals to create buffered signals
  a remove cyclic prefix (CP) block~ configured to remove CP from the buffered signals;
  a fast fourier transform (FFT) block, configured to produce a frequency domain signal for each of the CP removed signals;
  a phase tracking block, configured to produce a phase offset;
  a phase locked loop (PLL) block, configured to use the phase offset to determine a frequency offset and symbol timing and to adjust the numerically controlled oscillator (NCO) signal;
  a resampler block, configured to receive the frequency offset and the symbol timing, compute an estimated value of a fractional offset, perform a correction in the frequency domain based upon the estimated value of the fractional offset and create processed signals and
  a time and frequency synchronization block, configured to produce sampling frequency estimation on the processed signals.

27. The IC of claim 26 wherein the input is an antenna input.

28. The IC of claim 27 wherein the antenna input includes a plurality of antenna inputs configured to receive a plurality of signals.

29. The IC of claim 26, further comprising:
  a matched filter (MF)/Decimate block; and
  a minimum mean square error (MMSE) and pertone normalization block, configured to recover transmitted data in the processed signal from noise.

30. The IC of claim 29, further comprising a data/pilot block, configured to separate data bits from pilot bits in the processed signal.

31. The IC of claim 30 wherein the data/pilot block processes the processed signal via soft demodulating, de-interleaving, de-muxing, or soft viterbi decoding.

* * * * *